United States Patent
Alaghi et al.

(10) Patent No.: US 12,550,053 B2
(45) Date of Patent: Feb. 10, 2026

(54) SELF-LOCALIZING WIRELESS COMMUNICATIONS

(71) Applicant: META PLATFORMS TECHNOLOGIES, LLC, Menlo Park, CA (US)

(72) Inventors: Armin Alaghi, Kirkland, WA (US); Muzaffer Kal, Redmond, WA (US); Richard Andrew Newcombe, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 618 days.

(21) Appl. No.: 17/964,631

(22) Filed: Oct. 12, 2022

(65) Prior Publication Data

US 2024/0129846 A1    Apr. 18, 2024

(51) Int. Cl.
*H04W 48/20* (2009.01)
*G06T 7/73* (2017.01)
*H04W 64/00* (2009.01)

(52) U.S. Cl.
CPC .............. *H04W 48/20* (2013.01); *G06T 7/73* (2017.01); *H04W 64/003* (2013.01); *G06T 2200/04* (2013.01); *G06T 2207/30244* (2013.01)

(58) Field of Classification Search
CPC ..... H04W 48/20; H04W 64/003; H04W 4/33; H04W 4/029; H04W 48/16; H04W 76/10; G06T 7/73; G06T 2200/04; G06T 2207/30244; G06T 7/246; G06T 2207/10004
See application file for complete search history.

(56) References Cited

U.S. PATENT DOCUMENTS

| | | | |
|---|---|---|---|
| 8,155,081 B1 | 4/2012 | Mater et al. | |
| 2011/0274000 A1 | 11/2011 | King et al. | |
| 2012/0302261 A1* | 11/2012 | Tinnakornsrisuphap | H04W 64/00 455/456.4 |
| 2015/0142391 A1* | 5/2015 | Flynn | H04W 16/20 703/1 |
| 2020/0364901 A1 | 11/2020 | Choudhuri et al. | |
| 2021/0042958 A1 | 2/2021 | Engel et al. | |

OTHER PUBLICATIONS

EPO—European Search Report for European Patent Application No. 23202352.3, dated Feb. 27, 2024, 7 pages.

* cited by examiner

*Primary Examiner* — Christopher M Brandt
(74) *Attorney, Agent, or Firm* — Greenberg Traurig, LLP (57) ABSTRACT

In one embodiment, a method includes accessing a map of a building floor plan with locations of access points within the floor plan, the access points being capable of performing wireless communications with wireless devices. Determining a pose of a wireless device within the map using images captured by one or more cameras of the wireless device. Selecting a preferred access point based on the pose of the wireless device, the floor plan, and the locations of the plurality of access points within the floor plan. Configuring wireless communication settings of the wireless device to communicate with the preferred access point based on the pose of the wireless device and the location of the preferred access point within the floor plan.

20 Claims, 6 Drawing Sheets

SELF-LOCALIZING WIRELESS COMMUNICATIONS

TECHNICAL FIELD

This disclosure generally relates to wireless communications.

BACKGROUND

A mobile computing device—such as a smartphone, tablet computer, laptop computer, or Augmented Reality/Virtual Reality (AR/VR) headsets—may include functionality for determining its location, direction, or orientation, such as a Global Positioning System (GPS) receiver, compass, gyroscope, or accelerometer. Such a device may also include functionality for wireless communication, such as Bluetooth communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

Certain mobile devices, such as AR/VR headsets, may face certain practical design constraints which may include the need to minimize power consumption, in-device memory capability and weight restrictions. At the same time, these mobile devices may utilize self-localization, mapping, and wireless communication technology, which may require fairly large power and computing outputs. Therefore, it is desirable for devices such as AR/VR headsets to be able to utilize the aforementioned technology while consuming energy and processing data efficiently.

SUMMARY OF PARTICULAR EMBODIMENTS

Wireless devices which communicate through frequencies in the millimeter range (approximately 2.4 gHz or above) currently spend a lot of time, energy and computing resources in establishing a secure communication connection between the device and a host such as an access point or router. Devices which communicate through high frequency wavelengths usually require nearly line of sight pathways, or narrow beam communications with little interference in order for the signal waves to travel back and forth. Thus, the physical location of the wireless device and the pose of its antenna are important factors in establishing a secure communication connection. Current devices go through a beam forming which is a technique that allows for the focusing of wireless signals towards a specific direction or target device so that the device and host may concentrate their signal waves at each other. To initiate the process, the host device sends wide beam communication signals in nearly all directions until a device sends a response through a communication handshake process. From there, the device and host communicate back and forth and establish a secure connection. The connection persists until the signal to noise ratio (SNR) becomes too unfavorable which might occur if the device moves it physical position in relation to the host. When this occurs, the device and host will have to reestablish their connection. In addition to establishing narrow beam connections with the host, the device may need to send wireless signals to explore the environment in order to build channel signal models. Channel signal models may be used to predict the way wireless communication signals will travel between the host and device by mapping any types of interference the signal may encounter. This information may be used to help adjust its signal-processing computations to denoise communication signals.

As previously mentioned, while wide beam communication in route to establishing a communication handshake are usually a prerequisite step to beam forming, the process is inefficient as it consumes time, energy, and computing resources. Also, if connection is lost or disrupted during communication, the wide beam process needs to be reinitiated, furthering the inefficiency. Visual inertial odometry (VIO) can be used to help make the communication connection through beam forming process between the host and wireless device more efficient. VIO can be utilized to help the device inform the host on the device's position and movement to establish and keep a secure connection without having to engage in the inefficient wide beam process. When VIO is used in conjunction with a map feature which has the location of each host device, the device and most suitable host will establish a narrow beam communication. As the device moves throughout space, the device's position is tracked using VIO and its location information will be used by the host to redirect communication signals accordingly so that the SNR does not drop to unacceptable levels and the inefficient wide beam connection process doesn't have to take place. In the event where there are multiple host devices, as the device moves and its position is tracked with VIO, the device may switch to a better positioned host device without having to reestablish connection through the wide beam process.

VIO can also be utilized in situations where there is no readily available map. In such situations, the wireless device could build one utilizing a technique known as SLAM (simultaneous localization and mapping) to simultaneously create a map of the environment and localize itself within the environment map. Once the environment map is generated, the device could use WPS (Wi-Fi positioning system) or other wireless positioning techniques to estimate the location of the host. The estimated location of the host could then be positioned within the map. Thereafter, the device will connect to the most suitable host through beam forming (without first needing wide beam communication) and use VIO to remain connected or switch to a better host as necessary when the device's position moves.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Mobile communication devices which may include AR/VR devices may utilize self-efficient VIO-based SLAM tracking systems, which may comprise a tracking engine and a mapping engine performed at different frequencies to provide a continuous tracking a pose of the user in an environment and a localization of the user in a live map. Particular embodiments disclosed in the present disclosure may provide a tracking engine in the tracking system comprising a tracking unit, an inertial measurement unit (IMU) integration unit, and a filter unit to generate a state of the user in an environment at high frequency. The filter unit in the present disclosure may estimate the state of the user in the environment based on the correspondence data identified in a series of images sent from the tracking unit and aggregated IMU measurements sent from the IMU unit. Furthermore, the IMU integration unit may further provide predicted poses to the tracking unit to facilitate the identification of the correspondence data. The filter unit also sends a most-updated state to the IMU integration unit to refine IMU measurements. Therefore, the tracking engine disclosed in the present disclosure is able to perform a precise, self-efficient tracking and localization for the user or a device.

Particular embodiments disclosed in the present disclosure may provide a mapping engine comprising a mapping unit. The mapping unit in the present disclosure retrieves a corresponding global map based on key points in the images sent from the tracking unit and the state of the user sent from the filter unit. The mapping unit may retrieve the corresponding map from an on-device storage or from a cloud periodically or based on demands, so that the tracking system may perform a global localization for the user in a cost, energy, and resource consumption-efficient way. In particular embodiments, the mapping unit may comprise an on-device storage which stores one or more small, offline maps. In addition, the mapping unit disclosed in the present disclosure may further build or update live maps or local maps based on the received key points in the images if needed. Furthermore, the mapping unit may send the mapped points, which are corresponding to the key points and the descriptors in the images, in the maps to an anchor interface for sharing with other users utilizing the same global map as a persistent anchor. In particular embodiments, the mapping unit may operate with an anchor interface to send data over to one or more users, client system, networking system, third-party system, or any suitable system and network, in order to share and persist common data identified in the tracking system to be utilized via an application.

Particular embodiments disclosed in the present disclosure may provide that the tracking unit receives one or more images captured by one or more cameras and the predicted poses of the user from the IMU integration unit to search related or common features in a series of the images. In particular embodiments, the tracking unit may send correspondence data including identified features to the filter unit for estimating a state of the user. In particular embodiments, the tracking unit of the tracking engine may send identified features to the mapping unit of the mapping engine to retrieve a corresponding global map. The filter unit may receive the correspondence data from the tracking unit and receive the aggregated IMU measurements from the IMU integration unit. The filter unit may estimate a state of the user based on the correspondence data and the aggregated IMU measurements. In particular embodiments, the state of the user may comprise a pose of the user relative to an environment which is built based on the images captured by the cameras. Furthermore, the filter unit may send state information of the user to the IMU integration unit to refine or calibrate IMU measurements. In particular embodiments, the filter unit may also send the state information and mapped points identified in the corresponding global map to the mapping unit of the mapping engine for building or updating the corresponding global map if needed.

Particular embodiments disclosed in the present disclosure include that the tracking system may be implemented in any suitable computing device, such as, for example, a personal computer, a laptop computer, a cellular telephone, a smartphone, a tablet computer, an augmented/virtual reality device, a head-mounted device, a portable smart device, a wearable smart device, or any suitable device which is compatible with the tracking system. In the present disclosure, a user which is being tracked and localized by the tracking device, the tracking device may refer to a device mounted on a movable object, such as a vehicle, or a device attached to a person. In the present disclosure, a user may be an individual (human user), an entity (e.g., an enterprise, business, or third-party application), or a group (e.g., of individuals or entities) that interacts or communicates with the tracking system. In particular embodiments, the IMU integration unit, the tracking unit, and the filter unit in the tracking engine are located within a head-mounted device, and the mapping unit in the mapping engine is implemented in a local computing device separated from the head-mounted device. In particular embodiments, the IMU integration unit may be located within a head-mounted device, and the tracking unit, the filter unit, and the mapping unit may be implemented in a local computing device separated from the head-mounted device. The local computing device comprises one or more processors configured to implement the tracking unit, the filter unit, and the mapping unit. In one embodiment, each of the processors may be configured to implement the tracking unit, the filter unit, and the mapping unit separately.

Particular embodiments disclosed in the present disclosure may include situations where the wireless device may utilize an environment map feature, such as a live map, which has the location of each host device, to establish narrow beam communications. In particular embodiments, the narrow beam connection may be completed without the need to send wide beam communication signals to establish a communication handshake. In particular embodiments, the communication device may move throughout space, and the device's position may be tracked using VIO and its location information may be used by the host to redirect communication signals (beam angling) accordingly so that the SNR does not drop to unacceptable levels which would lead to disruptions in the wireless communication connection. In the event where there are multiple host devices, as the device moves and its position is tracked with VIO, the device may switch to a better positioned host device without having to reestablish connection through the wide beam process. In particular embodiments, the communication device may utilize a map feature and VIO to build channel signal models which may be used to adjust signal-processing computations to denoise communication signals.

In particular embodiments when there is no readily available map, the wireless communication device may build an environment map. In particular embodiments, the wireless device may use a localization technique, such as SLAM, to simultaneously create a map of the environment and localize itself within the map. In particular embodiments, once the wireless device has built the environment map, it may utilize a wireless positioning technique such as WPS to estimate the location a host device and the estimated location of the host could then be positioned on the map. In particular embodiments, the wireless device may then establish a narrow beam connection to the most suitable host without having to first engage in a wide beam connection process. In particular embodiments, the most suitable host may be the host with the most direct line of sight to the wireless device. In particular embodiments, the most suitable host may be the host with the strongest signal strength between the wireless device and the plurality of access points. In particular embodiments, the wireless device may use VIO to remain connected with the host or switch to a better host when the wireless device's position moves.

Figure 1:
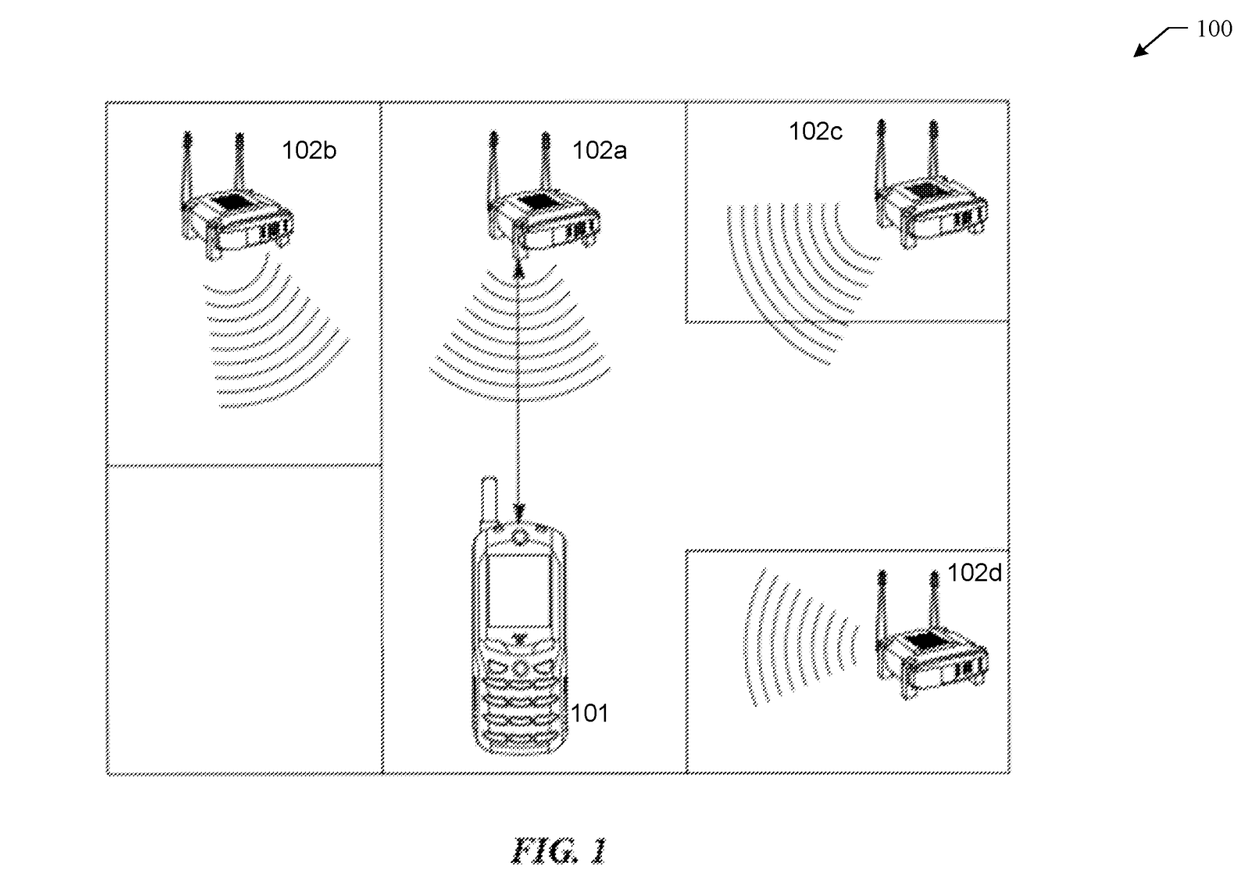
FIG. 1 illustrates a plurality of access points and a wireless device.

FIG. 1 illustrates a plurality of access points and a wireless device. FIG. 1 may illustrate an example floor plan 100 of a building which may be displayed within an environment map. In particular embodiments, the example floor plan 100 may comprise of a wireless device 101 and a plurality of access points 102a-d located on the map. In particular embodiments, the plurality of access points 102a-d may be capable of performing wireless communications with wireless devices. As an example and not by way of limitation, the wireless communications may be performed in a high frequency range of 2.4 GHz and above. In particular embodiments, the plurality of access points 102a-d may communicate with the wireless devices using beam forming. In particular embodiments, the environment map may be a 3D map comprising map features corresponding to observable features in the building. As an example and not by way of limitation, the observable features of a building may include but are not limited to walls, doors or any other objects or features which may be within a building.

In particular embodiments, the environment map may be comprised of layouts other than a building floor plan such as a city plan, a theme park, or any other outdoor venues. In particular embodiments, the layout of outdoor venues such as but not limited to city plans or theme parks may be comprised of a 2-Dimensional or 3-Dimensional map of the buildings or structures of the venue and the locations of access points.

In particular embodiments, a pose of the wireless device 101 within the map may be determined using images captured by one or more cameras of the wireless device. In particular embodiments, the pose of the wireless device is determined by comparing features detected within the images captured by the one or more cameras of the wireless device to the map features stored in the 3D map. In particular embodiments, the wireless device 101 may contain an IMU and the pose of the wireless device within the map may be further determined using the IMU of the wireless device 101.

In particular embodiments, a preferred access point 102a may be selected from the plurality of access points 102a-d based on the pose of the wireless device 101, the floor plan 100, and the locations of the plurality of access points 102a-d within the floor plan 100. In particular embodiments, the preferred access point 102a may be selected based on the lines of sight between the wireless device 101 and the plurality of access points 102a-d. In particular embodiments, the preferred access point 102a may be selected based on signal strength with the wireless device 100. In particular embodiments, wireless communication settings of the wireless device 101 may be configured to communicate with the preferred access point 102a based on the pose of the wireless device 101 and the location of the preferred access point 102a within the floor plan 100. In particular embodiments, the wireless communication settings may be configured based on the floor plan 100.

Figure 2A:
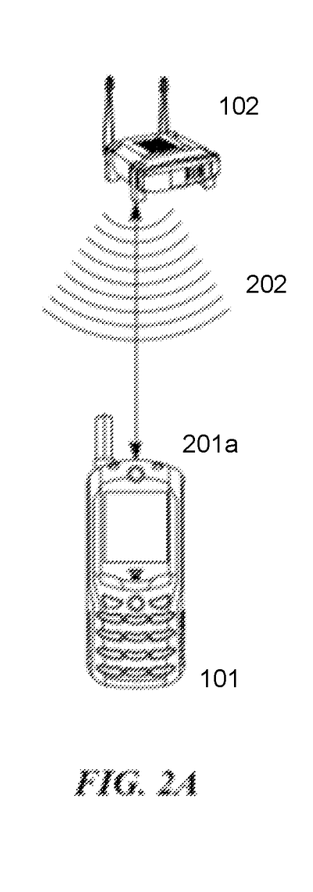
FIGS. 2A-2B illustrate beam forming and beam angling.
Figure 2B:
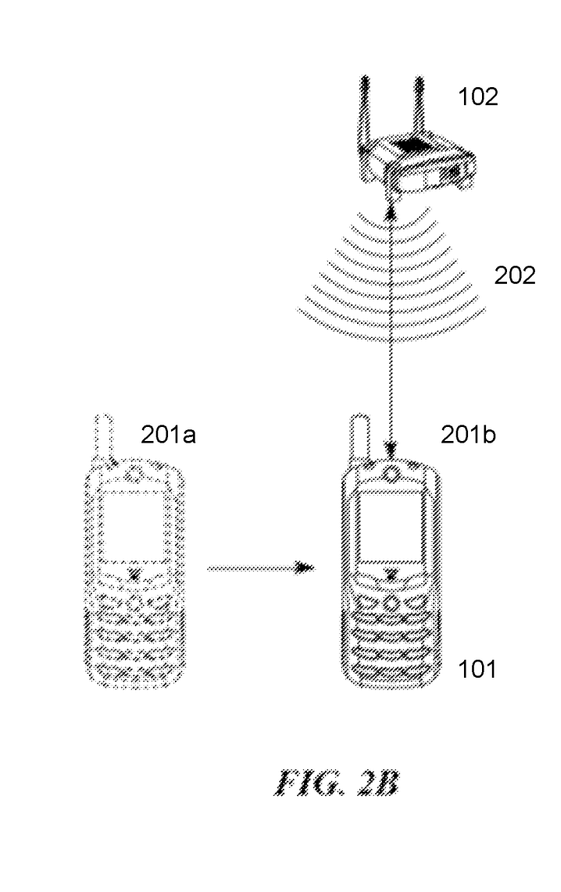

FIGS. 2A-2B illustrate beam forming and beam angling. FIG. 2A may illustrate a wireless device 101 located at a pose 201a. In particular embodiments, wireless communication settings of the wireless device 101 may be configured to communicate with the access point 102 through communication signals 202. In particular embodiments, the access point 102 may communicate with the wireless device 101 using beam forming. FIG. 2B may illustrate the wireless device 101 which moved position from pose 201a to new pose 201b. In particular embodiments, the mobile device 101 may share its pose with the access point 102. In particular embodiments, the access point 102 may angle its communication signals 202 towards the communication device's new location 201b. In particular embodiments, the angling of communication signals 202 may be considered beam angling.

Figure 3A:
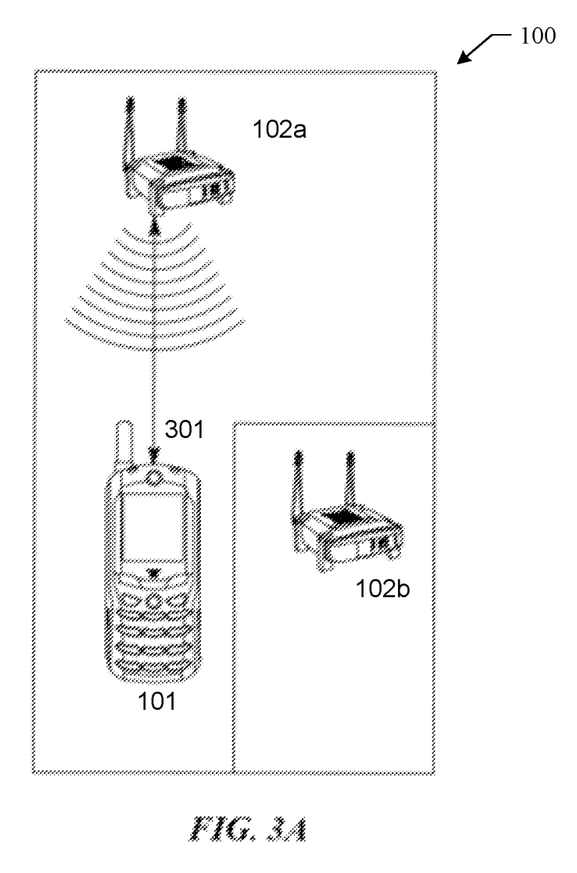
FIGS. 3A-3B illustrate the wireless communication device establishing connections with different preferred access points.

FIGS. 3A-3B illustrate the wireless device configuring wireless communication connections with different preferred access points. FIG. 3A may illustrate mobile device 101 with its location at pose 301 within an example floor plan 100. In particular embodiments, the wireless device 101 may configure wireless communication settings with preferred access point 102a. In particular embodiments, the preferred access point 102a may be selected from the plurality of access points based on a pose 301 of the wireless device 101, the floor plan 100, and the locations of the plurality of access points within the floor plan 100.

Figure 3B:
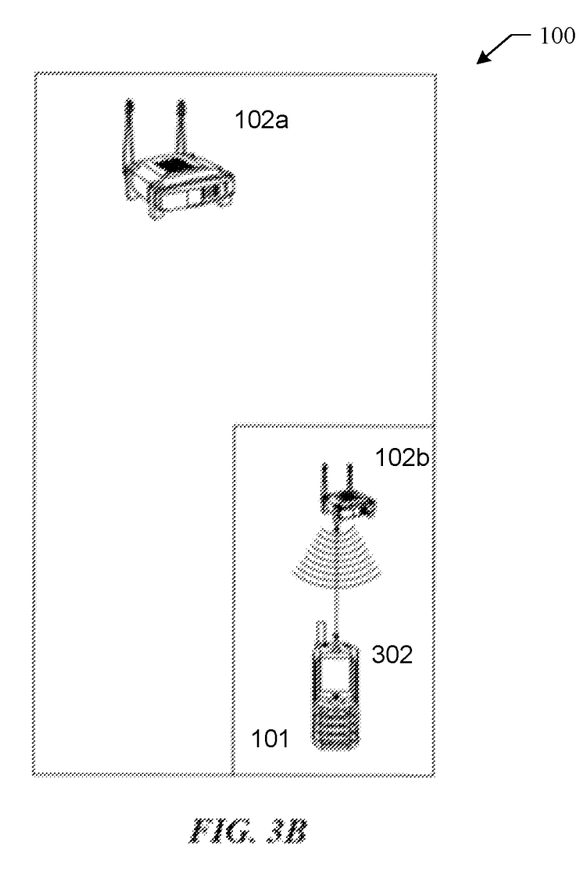

FIG. 3B may illustrate mobile device 101 located at a new pose 302 within an example floor plan 100. In particular embodiments, the wireless device may share its pose with one or more access points of the plurality of access points. In particular embodiments, wireless communication settings of the wireless device 101 may be configured to communicate with a new preferred access point 102b based on a new pose 302 of the wireless device 101. In particular embodiments, the new preferred access point 102b may be selected based on the lines of sight between the wireless device 101 and the plurality of access points. In particular embodiments, the new preferred access point 102b may be selected based on the signal strength between the wireless device and the plurality of access points. In particular embodiments, the new preferred access point 102b may be selected from the plurality of access points based on the new pose 302 of the wireless device 101, the floor plan 100, and the locations of the plurality of access points within the floor plan 100.

Figure 4:
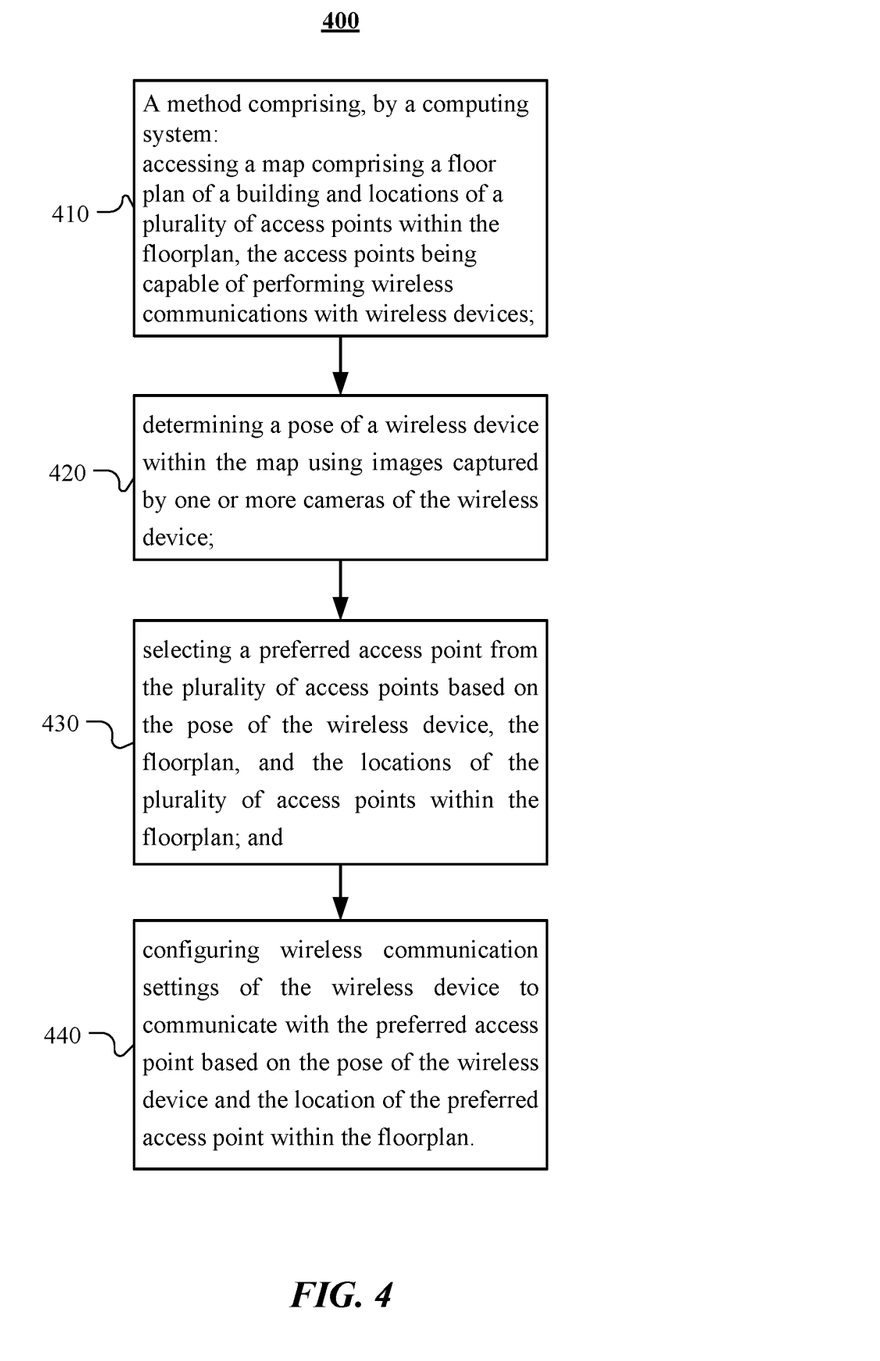
FIG. 4 illustrates an example method for self-localizing wireless communications.

FIG. 4 illustrates an example method 400 for self-localizing wireless communications. The method may begin at step 410, where a computing system may access an environment map comprising a floor plan of a building and locations of a plurality of access points within the floor plan, the access points being capable of performing wireless communications with wireless devices. At step 420, determining a pose of a wireless device within the map using images captured by one or more cameras of the wireless device. At step 430, selecting a preferred access point from the plurality of access points based on the pose of the wireless device, the floor plan, and the locations of the plurality of access points within the floor plan. At step 440, configuring wireless communication settings of the wireless device to communicate with the preferred access point based on the pose of the wireless device and the location of the preferred access point within the floor plan. Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for self-localizing wireless communications including the particular steps of the method of FIG. 4, this disclosure contemplates any suitable method for self-localizing wireless communications including any suitable steps, which may include all, some, or none of the steps of the method of FIG. 4, where appropriate. In addition, the techniques described in this disclosure may be applied to outdoor environments as well. As an example and not by way of limitation, the environment map may be comprised of a city plan, a theme park, or any other outdoor venue. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
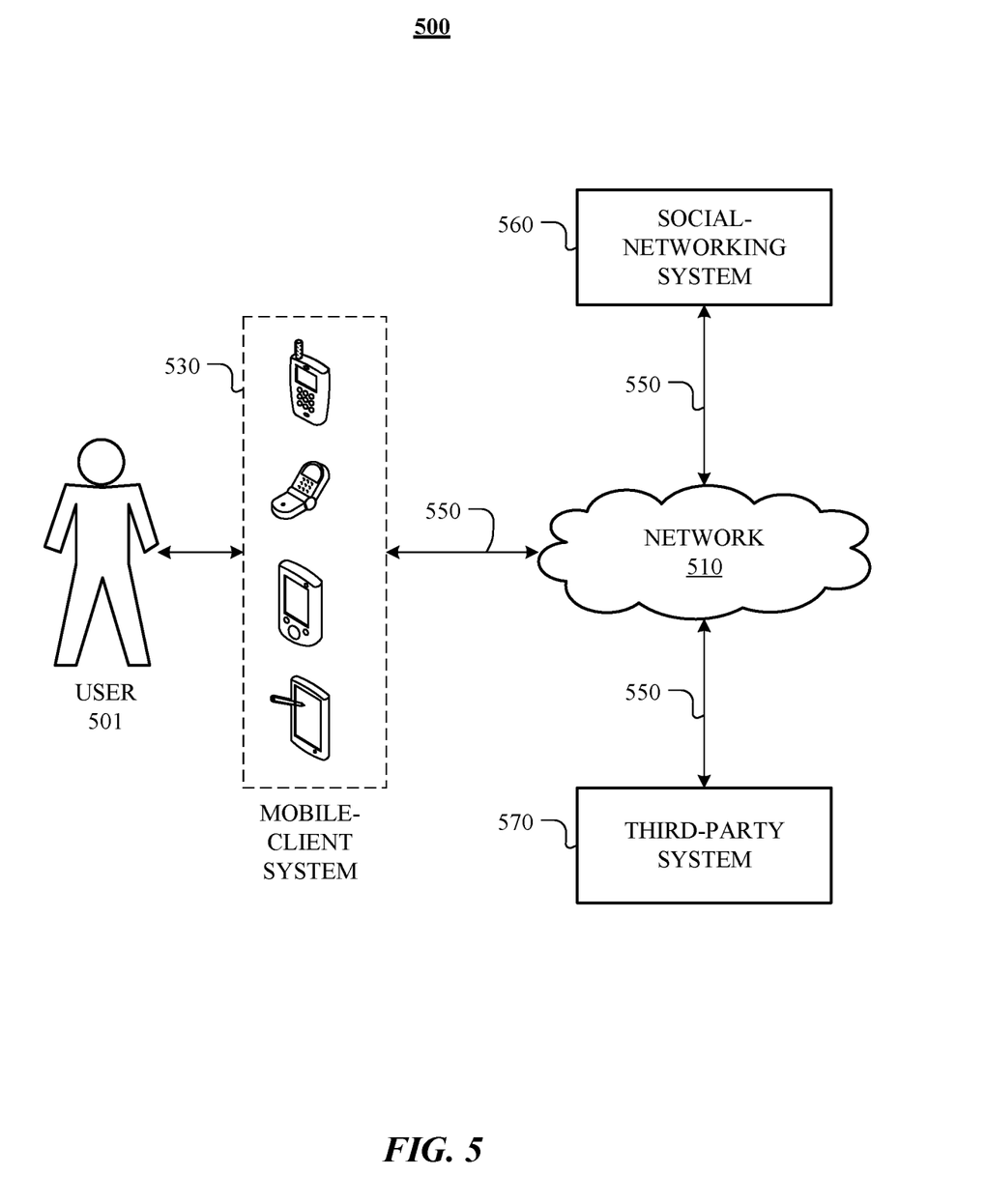
FIG. 5 illustrates an example network environment associated with a social-networking system.

FIG. 5 illustrates an example network environment 500 associated with a social-networking system. Network environment 500 includes a user 501, a client system 530, a social-networking system 560, and a third-party system 570 connected to each other by a network 510. Although FIG. 5 illustrates a particular arrangement of user 501, client system 530, social-networking system 560, third-party system 570, and network 510, this disclosure contemplates any suitable arrangement of user 501, client system 530, social-networking system 560, third-party system 570, and network 510. As an example and not by way of limitation, two or more of client system 530, social-networking system 560, and third-party system 570 may be connected to each other directly, bypassing network 510. As another example, two or more of client system 530, social-networking system 560, and third-party system 570 may be physically or logically co-located with each other in whole or in part. Moreover, although FIG. 5 illustrates a particular number of users 501, client systems 530, social-networking systems 560, third-party systems 570, and networks 510, this disclosure contemplates any suitable number of users 501, client systems 530, social-networking systems 560, third-party systems 570, and networks 510. As an example and not by way of limitation, network environment 500 may include multiple users 501, client system 530, social-networking systems 560, third-party systems 570, and networks 510.

In particular embodiments, user 501 may be an individual (human user), an entity (e.g., an enterprise, business, or third-party application), or a group (e.g., of individuals or entities) that interacts or communicates with or over social-networking system 560. In particular embodiments, social-networking system 560 may be a network-addressable computing system hosting an online social network. Social-networking system 560 may generate, store, receive, and send social-networking data, such as, for example, user-profile data, concept-profile data, social-graph information, or other suitable data related to the online social network. Social-networking system 560 may be accessed by the other components of network environment 500 either directly or via network 510. In particular embodiments, social-networking system 560 may include an authorization server (or other suitable component(s)) that allows users 501 to opt in to or opt out of having their actions logged by social-networking system 560 or shared with other systems (e.g., third-party systems 570), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 30 through blocking, data hashing, anonymization, or other suitable techniques as appropriate. In particular embodiments, third-party system 570 may be a network-addressable computing system that can host self-localizing wireless communications. Third-party system 570 may generate, store, receive, and send self-localizing wireless communications data, such as, for example, the data required for self-localizing wireless communications. Third-party system 570 may be accessed by the other components of network environment 500 either directly or via network 510. In particular embodiments, one or more users 501 may use one or more client systems 530 to access, send data to, and receive data from social-networking system 560 or third-party system 570. Client system 530 may access social-networking system 560 or third-party system 570 directly, via network 510, or via a third-party system. As an example and not by way of limitation, client system 530 may access third-party system 570 via social-networking system 560. Client system 530 may be any suitable computing device, such as, for example, a personal computer, a laptop computer, a cellular telephone, a smartphone, a tablet computer, or an augmented/virtual reality device.

This disclosure contemplates any suitable network 510. As an example and not by way of limitation, one or more portions of network 510 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 510 may include one or more networks 510.

Links 550 may connect client system 530, social-networking system 560, and third-party system 570 to communication network 510 or to each other. This disclosure contemplates any suitable links 550. In particular embodiments, one or more links 550 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 550 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 550, or a combination of two or more such links 550. Links 550 need not necessarily be the same throughout network environment 500. One or more first links 550 may differ in one or more respects from one or more second links 550.

Figure 6:
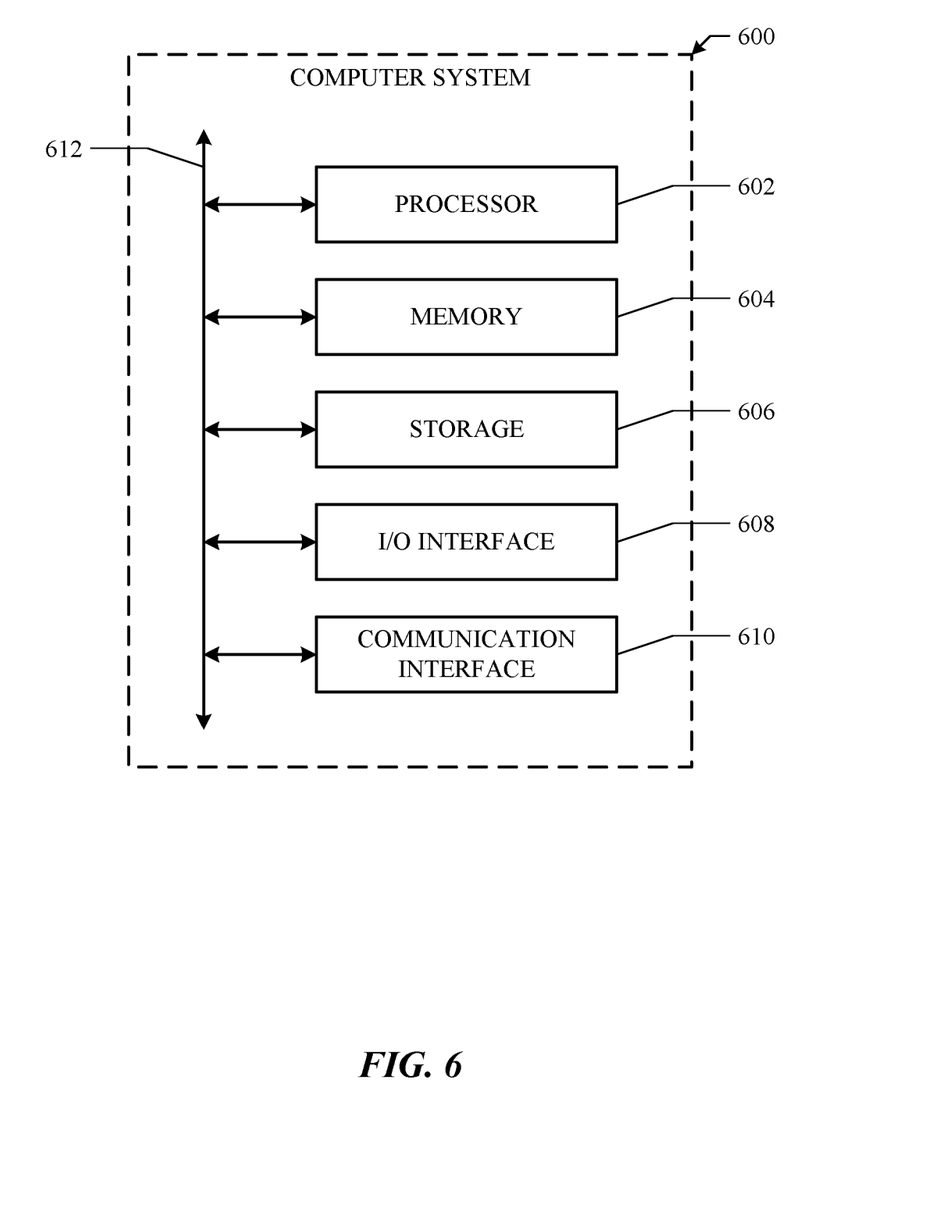
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
generating, using a wireless device, an environment map including a floor plan of a building and locations of a plurality of access points within the floor plan;
determining that a device is a host device in the environment map based on a line of sight from the wireless device to the device;
determining a pose of a wireless device within the environment map using images captured by one or more cameras of the wireless device; and
selecting a preferred access point from the plurality of access points based on the pose of the wireless device, the floor plan, and the locations of the plurality of access points within the floor plan.

2. The method of claim 1, wherein the plurality of access points communicate with the wireless devices using beam forming.

3. The method of claim 1, further comprising:
configuring wireless communication settings of the wireless device to communicate with the preferred access point based on the pose of the wireless device and the location of the preferred access point within the floor plan, the wireless communications are performed in a high frequency range of 2.4 GHz and above.

4. The method of claim 1, wherein the environment map is a 3D map comprising map features corresponding to observable features in the building.

5. The method of claim 1, wherein the pose of the wireless device is determined by comparing features detected within the images captured by the one or more cameras of the wireless device to the environment map features stored in a 3D map.

6. The method of claim 1, wherein the pose of the wireless device within the environment map is further determined using an inertial measurement unit of the wireless device.

7. The method of claim 1, wherein the preferred access point is selected based on signal strength between the wireless device and the plurality of access points.

8. The method of claim 1 further comprising:
configuring wireless communication settings of the wireless device to communicate with the preferred access point based on the pose of the wireless device and the location of the preferred access point within the floor plan; and
sharing the pose with one or more access points of the plurality of access points.

9. The method of claim 8 further comprising: configuring wireless communication settings of the wireless device to communicate with a different preferred access point based on a new pose of the wireless device.

10. The method of claim 8, wherein the wireless communication settings are configured based on the floor plan.

11. One or more computer-readable non-transitory storage media embodying software that is operable when executed to:
generate, using a wireless device, an environment map including a floor plan of a building and locations of a plurality of access points within the floor plan;
determine that a device is a host device in the environment map based on a line of sight from the wireless device to the device;
determine a pose of a wireless device within the environment map using images captured by one or more cameras of the wireless device; and
select a preferred access point from the plurality of access points based on the pose of the wireless device, the floor plan, and the locations of the plurality of access points within the floor plan.

12. The media of claim 11, wherein the plurality of access points communicate with the wireless devices using beam forming.

13. The media of claim 11, wherein the environment map is a 3D map comprising map features corresponding to observable features in the building.

14. The media of claim 11, wherein the pose of the wireless device within the environment map is further determined using an inertial measurement unit of the wireless device.

15. The media of claim 11, further comprising: share the pose with one or more access points of the plurality of access points.

16. A system comprising:
one or more processors of a wireless device; and
one or more computer-readable non-transitory storage media coupled to one or more of the processors and comprising instructions operable when executed by one or more of the processors to cause the system to:
generate an environment map including a floor plan of a building and locations of a plurality of access points within the floor plan;
determine that a device is a host device in the environment map based on a line of sight from the wireless device to the device;
determine a pose of a wireless device within the environment map using images captured by one or more cameras of the wireless device; and
select a preferred access point from the plurality of access points based on the pose of the wireless device, the floor plan, and the locations of the plurality of access points within the floor plan.

17. The system of claim 16, wherein the plurality of access points communicate with the wireless devices using beam forming.

18. The system of claim 16, wherein the environment map is a 3D map comprising map features corresponding to observable features in the building.

19. The system of claim 16, wherein the pose of the wireless device within the environment map is further determined using an inertial measurement unit of the wireless device.

20. The system of claim 16 further comprising: share the pose with one or more access points of the plurality of access points.

\* \* \* \* \*